United States Patent
Fletcher et al.

(10) Patent No.: US 6,731,487 B2
(45) Date of Patent: May 4, 2004

(54) METHOD AND DEVICES FOR OPTIMIZING POWER CONSUMPTION OF TRIP UNITS CONTAINING MICROPROCESSORS

(75) Inventors: David Fletcher, Simsbury, CT (US); Gregory Lavoie, Bristol, CT (US)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 10/063,100

(22) Filed: Mar. 20, 2002

(65) Prior Publication Data

US 2003/0179528 A1 Sep. 25, 2003

(51) Int. Cl.[7] .............................................. H02H 3/08
(52) U.S. Cl. ........................................ 361/93.2; 361/96
(58) Field of Search ........................ 361/93.2, 42, 93.1, 361/96, 98, 97, 71.8, 44, 93; 700/292, 293, 295

(56) References Cited

U.S. PATENT DOCUMENTS

| | | | | |
|---|---|---|---|---|
| 4,827,369 A | * | 5/1989 | Saletta et al. ................. 361/96 |
| 4,996,646 A | * | 2/1991 | Farrington ................... 700/293 |
| 5,889,450 A | | 3/1999 | Kim et al. ..................... 355/18 |
| 5,974,545 A | | 10/1999 | Obermeier et al. ............ 713/1 |
| 6,094,330 A | | 7/2000 | Criniti et al. ............... 361/93.1 |
| 6,167,329 A | | 12/2000 | Engel et al. ................ 700/293 |
| 6,473,281 B1 | * | 10/2002 | Kornblit ....................... 361/42 |

* cited by examiner

Primary Examiner—Rajnikant B Patel
(74) Attorney, Agent, or Firm—Cantor Colburn LLP

(57) ABSTRACT

A method is provided for optimizing the power consumption of a trip unit. The method comprises sensing a first output from a power system, the first output including a first current and a current-sensing signal; supplying a power supply with only the first current, or with a second current alone or in combination with the first current; powering a microprocessor from the power supply; inputting a second output to the microprocessor indicative of whether the power supply is receiving the second current; operating the microprocessor at a first state when the second output indicates the power supply is not receiving the second current; and operating the microprocessor at a second state when the second output indicates the power supply is receiving the second current alone or in combination with the first current.

23 Claims, 2 Drawing Sheets

US 6,731,487 B2

METHOD AND DEVICES FOR OPTIMIZING POWER CONSUMPTION OF TRIP UNITS CONTAINING MICROPROCESSORS

BACKGROUND OF INVENTION

This disclosure generally relates to circuit breakers having a trip unit. More particularly, this disclosure relates to methods and devices for optimizing power consumption of trip units containing microprocessors.

Electronic trip units are used to actuate the separable contacts in a circuit breaker to protect electrical equipment from damage due to irregularities (e.g., excessive current flow) in the power system. The circuit breaker typically includes voltage and current sensors that provide analog signals indicative of the power system. These signals are provided to the electronic trip unit, which typically compares the signals to predetermined protection parameters. Based on the comparison, the trip unit provides instantaneous protection by means of analog circuitry and higher levels of protection by means of a microprocessor.

U.S. Pat. No. 6,167,329 to Engle et al. provides a trip unit that includes a first microprocessor and analog to digital converter for managing circuit protection, but a second microprocessor and analog to digital converter for managing voltage protection and monitoring.

Thus, prior trip units require either two microprocessors to manage both instantaneous and higher level circuit protection functions, or require a microprocessor and solid-state circuitry to manage both instantaneous and higher level circuit protection functions.

SUMMARY OF INVENTION

A method is provided for optimizing the power consumption of a trip unit. The method comprises sensing a first output from a power system, the first output including a first current and a current-sensing signal; supplying a power supply with only the first current, or with a second current alone or in combination with the first current; powering a microprocessor from the power supply; inputting a second output to the microprocessor indicative of whether the power supply is receiving the second current; operating the microprocessor at a first state when the second output indicates the power supply is not receiving the second current; and operating the microprocessor at a second state when the second output indicates the power supply is receiving the second current alone or in combination with the first current.

A trip unit comprising a microprocessor, an analog-to-digital converter, and a power supply is provided. The microprocessor is operable at either a first state or a second state, where the second state requires more power than the first state. The analog-to-digital converter is operatively connected to the microprocessor. The converter receives a current-sensing signal and provides this signal to the microprocessor. The power supply receives either a first current, or a second current alone or in addition to the first current. The power supply provides an output to the microprocessor indicative whether the power supply is receiving the second current. Here, the microprocessor adjusts between the first and second states depending upon the output.

A circuit breaker comprising a trip unit, and a current sensor is provided. The trip unit includes a microprocessor and a power supply. The current sensor provides a current-sensing signal to the microprocessor and a first current to the power supply. The circuit breaker further comprises an output from the power supply to the microprocessor. The output is indicative of whether the power supply is receiving the first current, or a second current from an auxiliary power source alone or in addition to the first current. The microprocessor operates at a first state when the power supply receives only the first current, but operates at a second state when the power supply receives the second current alone or in addition to the first current.

A control algorithm for a trip unit is provided. The algorithm comprises a first decision node configured to determine whether to operate a microcontroller in a first state if no auxiliary current is provided to a power supply of the trip unit and to operate the microcontroller in a second state if the auxiliary current is provided to the power supply. The first state consumes a first level of power by executing only a set of basic protection features. The second state consumes a second level of power by executing the set of basic protection features and a set of functional features.

The above-described and other embodiments, features and advantages are appreciated and understood by those skilled in the art from the following detailed description, drawings, and appended claims.

BRIEF DESCRIPTION OF DRAWINGS

Referring to the exemplary drawings wherein like elements are numbered alike.

DETAILED DESCRIPTION

Figure 1:
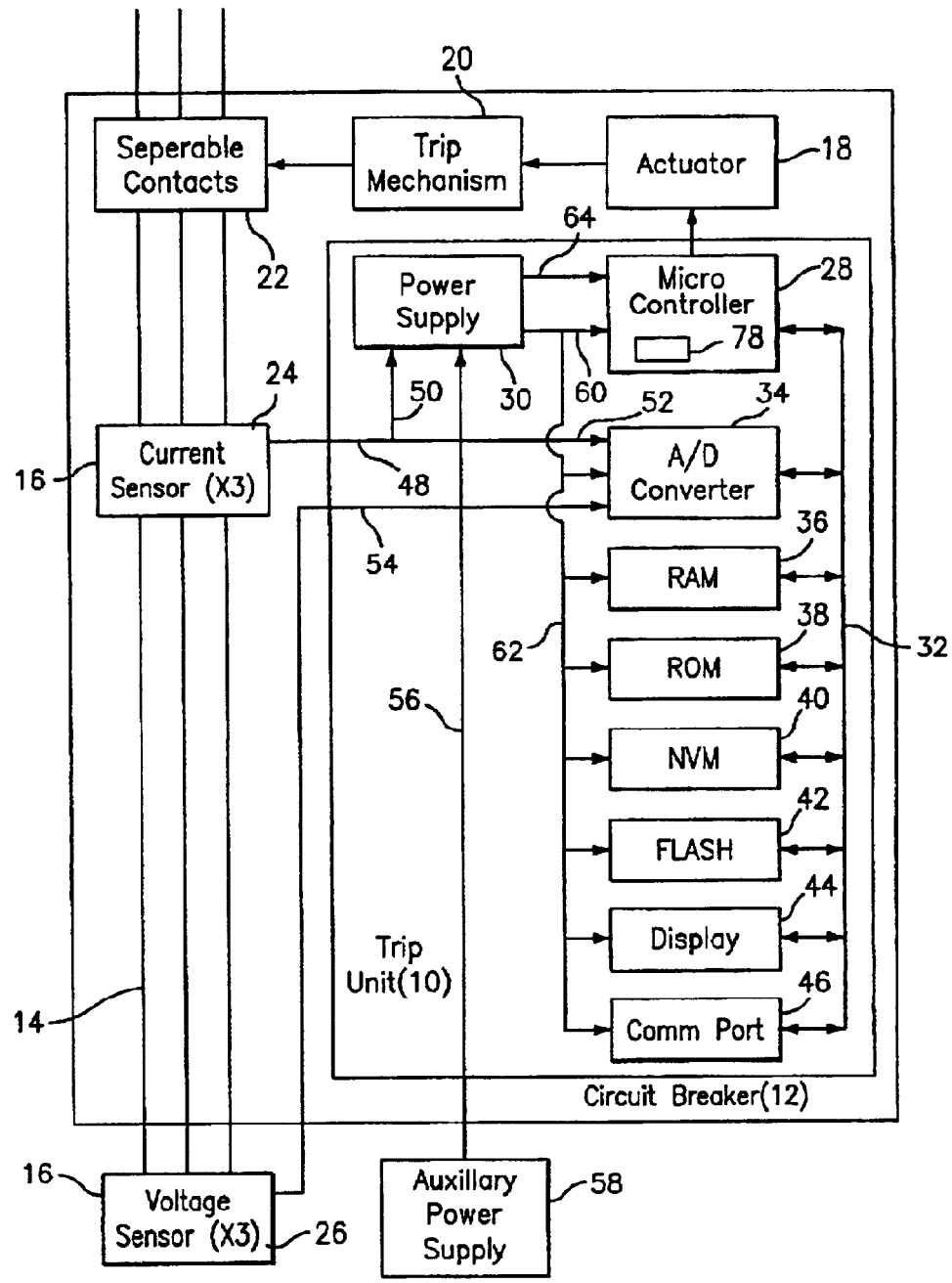
FIG. 1 is a schematic block diagram of an exemplary embodiment of a trip unit.

Referring now to FIG. 1, an exemplary embodiment of an electronic trip unit 10 is illustrated. The trip unit 10 is illustrated operatively connected by way of a circuit breaker 12 to a power system 14. Here, the power system 14 is illustrated by way of example only as a three-phase power system.

The circuit breaker 12 comprises sensors 16, an actuator 18, and a trip mechanism 20. The trip mechanism 20 is operatively connected to separable contacts 22 disposed in the power system 14. The trip unit 10 is operatively connected to the actuator 18 and the sensors 16. The sensors 16 are configured to detect the state of the power system 14. For example, the circuit breaker 12 includes a current sensor 24 and a voltage sensor 26 for each phase of the power system 14.

The trip unit 10 comprises a microprocessor 28, a power supply 30, and one or more peripherals that communicate with the microprocessor over a data path or bus 32. The peripherals can include, for example, an analog to digital (A/D) converter 34, random access memory (RAM) 36, read only memory (ROM) 38, non-volatile memory (NVM) 40, flash memory 42, a display 44, and a communications port 46. Here, the non-volatile memory 40 is configured to retain system information and programming during a power interruption or outage in the power system 14. Data, typically depicting the status of trip unit 10, is displayed by the display 44 in response to display signals received from the microprocessor 28 over the data path 32. It should be recognized that it is contemplated for some or all of the peripherals to be internal to the microprocessor 28.

The current sensors 24 provide a first output 48, which simultaneously provides a first current 50 to the power supply 30 and a current-sensing signal 52 to the A/D converter 34. The first current 50 is proportional to the current in the power system 14, but is stepped down by a predetermined ratio. For example, where the current sensor 24 has a 1000:1 ratio, and the power system 14 has 1000 amps, the first current 50 provided by the sensor is about one amp. The current-sensing signal 52 is indicative of a condition of the current in the power system 14.

The voltage sensor 26 provides a voltage-sensing signal 54 to the A/D converter 34. The voltage-sensing signal 54 is indicative of a condition of the voltage in the power system 14.

The power supply 30 is also configured to receive a second current 56 from an auxiliary power source 58. Thus, the power supply 30 is configured to receive either the first current 50 (e.g., when the auxiliary power source 58 is not available), both the first and second currents 50 and 56 (e.g., when the auxiliary power source 58 is available), or just the second current 56.

The power supply 30 is configured to provide power to the trip unit 10. For example, the trip unit 10 (e.g., microprocessor 28, the converter 34, memory 36, 38, 40, and 42, display 44, and port 46) receives an operating current 60 from the power supply 30 over power distribution lines 62.

In use, the separable contacts 22 are in a normally closed position so that power passes through the power system 14 to a load (not shown). The current sensor 24 and voltage sensor 26 provide the signals 52 and 54, respectively, to the A/D converter 34. The converter 34 converts these analog signals to digital signals, which are transferred over the data path 32 to the microprocessor 28.

The microprocessor 28 compares the condition of the power in the power system 14 as provided by the signals 52 and 54 to a predetermined set of protection parameters. In the event that the microprocessor 28 detects that one or more of the protection parameters are met, the microprocessor energizes the actuator 18. In turn, the actuator 18 opens the contacts 22 of the power system 14 via the trip mechanism 20. In an exemplary embodiment, the trip mechanism 20 is a mechanical device configured to drive open the contacts 22. In this manner, the trip unit 10 activates the circuit breaker 12 to open the contacts 22 so that power cannot pass through the power system 14 to the load.

In an exemplary embodiment, the microprocessor 28 is configured to adjust power consumption of the trip unit 10, on the fly, depending on the state of the second current 56 from the auxiliary power source 58. More specifically, the power supply 30 provides a second output 64 to the microprocessor 28. The second output 64 is indicative of whether the power supply 30 is receiving only the first current 50, both the first and second currents 50 and 56, or only the second current 56. Thus, the microprocessor 28 continuously monitors the power supply 30 to determine whether the power supply is receiving the second current 56.

Figure 2:
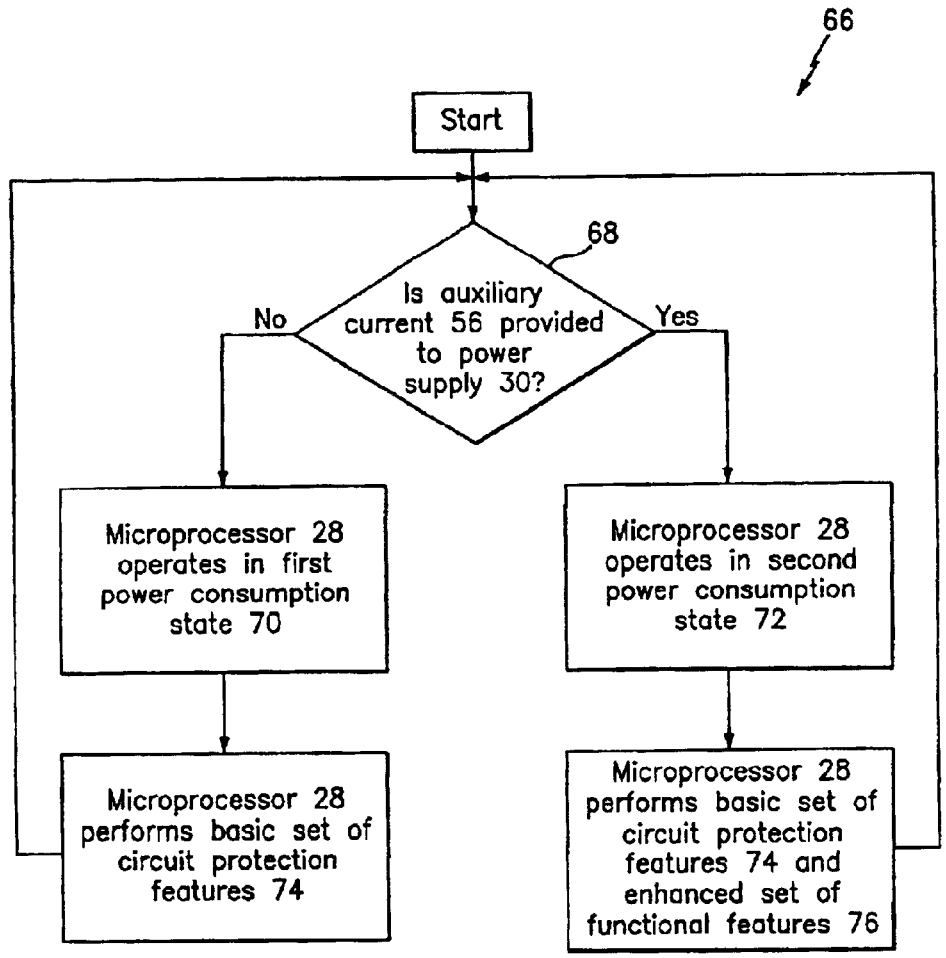
FIG. 2 is a block diagram of an exemplary embodiment of a control algorithm.

Turning now to FIG. 2, a control algorithm 66 for the trip unit 10 is illustrated.

The algorithm 66 resides in the microprocessor 28 in a known manner. Here, the algorithm 66 continuously monitors the second output 64. Namely, the algorithm 66 determines at a first decision node 68 whether the power supply 30 is receiving the second current 56 alone or in combination with the first current 50, or just the first current 50. Thus, the algorithm 66 enables the microprocessor 28 to continuously adjust its power consumption back and forth between a first or lower operating state 70 when only the first current 50 is available, and a second or higher operating state 72 when the second current 56 is available.

The microprocessor 28 is configured to perform or execute a basic set of protection features 74 when in the first state 62. Moreover, the microprocessor 28 is configured to perform or execute both the basic set of protection features 74 and an enhanced set of functional features 76 when in the second state 72.

The basic set of protection features 74 includes instantaneous over current protection, long time protection, short time protection, ground fault protection, and the like. The functional features 76 include enhanced features such as, but not limited to, waveform capture, metering, voltage protection algorithms, current protection algorithms, and communication functions. Accordingly, the trip unit 10 offers circuit protection at the first state 70 by way of the basic protection features 74. Additionally, the trip unit 10 provides enhanced capabilities at the second state 72 by way of both the basic protection features 74 and the functional features 76.

In an exemplary embodiment, the basic set of protection features 74 comprise ground fault and over current protection, while the functional features 76 comprise waveform capture, metering, voltage protection algorithms, current protection algorithms, and communication functions.

The microprocessor 28 (e.g., via the algorithm 66) continuously adjusts the power consumption of the trip unit 10 to correspond to the power available from the power supply 30 and the auxiliary power source 58. For example, the algorithm 66 adjusts between the first and second states 70 and 72, respectively by, for example, adjusting the clock speed at which the microprocessor 28 is operating. Typically, microprocessors running at faster or higher internal clock speeds consume proportionately more current and are capable of performing more functions than microprocessors running at slower or lower internal clock speeds.

In an exemplary embodiment, the microprocessor 28 further comprises circuitry 78, such as pre-scaling circuitry, that is configured to adjust the clock speed of the microprocessor between the first and second states 70 and 72, respectively. In an exemplary embodiment, the circuitry 78 is internal to the microprocessor 28. Of course, it should be recognized that it is contemplated for the circuitry 78 or any portion thereof to be external to the microprocessor 28.

Additionally, means other than or in addition to the circuitry 78 for adjusting the power consumption of the trip unit 10 are also contemplated. For example, the microprocessor 28 can adjust the power consumption of the trip unit 10 by adjusting the operating voltage of the microprocessor between a first voltage in the first state 70 and a second voltage in the second state 72, where the first voltage is lower than the second voltage. Alternately, the microprocessor 28 can adjust the power consumption of the trip unit 10 by turning off the operating current 60 to some or all of the peripherals (e.g., A/D converter 34, memories 36, 38, 40, and 42, display 44 and port 46, or any combination thereof) in the first state 70 and turning on the operating current to these peripherals in the second state 72.

Further, it is contemplated for the microprocessor 28 to adjust the power consumption of the trip unit 10 by adjusting the resolution and/or accuracy of some or all of the basic protection features 74 and/or the functional features 76. For example, it is contemplated for the first state 70 to operate the basic protection features 74 with a high accuracy and/or resolution and to operate one or more of the functional features 76 with a low accuracy and/or resolution. Typically, features running at a high accuracy and/or resolution consume proportionately more current than running the same features at lower accuracy and/or resolution.

It should be further recognized that combinations of adjusting the internal clock speed of the microprocessor 28, adjusting the operating voltage of the microprocessor, adjusting the peripherals on/off, and the like, used separately and/or in combination with one another are contemplated.

In this manner, the trip unit 10 optimizes the number of features and functions available according to the available power by adjusting the consumption of power. For example, the trip unit 10 provides at least basic circuit protection functions when the power available is low (e.g., the first state 70), but provides enhanced circuit functions (including circuit protection) when the power available is high (e.g., the second state 72) by adjusting between the first and second states.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of optimizing the power consumption of a trip unit, comprising:
   sensing a first output from a power system, said first output including a first current and a current-sensing signal, said current-sensing signal being indicative of current in said power system;
   supplying a power supply with only said first current, or with a second current alone or in combination with said first current;
   powering a microprocessor from said power supply;
   inputting a second output to said microprocessor indicative of whether said power supply is receiving said second current;
   operating said microprocessor at a first state when said second output indicates said power supply is not receiving said second current; and
   operating said microprocessor at a second state when said second output indicates said power supply is receiving said second current.

2. The method as in claim 1, wherein operating said microprocessor at said first state comprises:
   comparing said current-sensing signal to a set of predetermined protection parameters in said microprocessor; and
   actuating separable contacts connected to said power system if said current-sensing signal meets one or more of said set of predetermined protection parameters.

3. The method as in claim 2, wherein said set of predetermined protection parameters is selected from the group consisting of instantaneous over current protection, long time protection, short time protection, and ground fault protection.

4. The method as in claim 1, wherein operating said microprocessor at said second state comprises:
   performing a set of functional features selected from the group consisting of waveform capture, metering, voltage protection algorithms, current protection algorithms, and communication functions.

5. The method as in claim 4, further comprising:
   sensing a voltage-sensing signal from said power system, said voltage-sensing signal being indicative of voltage in said power system;
   comparing said voltage-sensing signal to a set of predetermined voltage protection parameters in said microprocessor; and
   actuating separable contacts connected to said power system if said voltage-sensing signal meets one ore more of said set of predetermined voltage protection parameters.

6. The method claim 1, further comprising:
   operating said microprocessor at a first clock speed in said first state; and
   operating said microprocessor at a second clock speed in said second state, said second clock speed being faster than said first clock speed.

7. The method as in claim 1, further comprising:
   reducing an operating voltage of said microprocessor in said first state; and
   increasing said operating voltage of said microprocessor in said second state.

8. The method as in claim 1, further comprising:
   turning off operating current to at least some peripherals operatively connected to said microprocessor in said first state; and
   turning on operating current to said at least some peripherals in said second state.

9. A trip unit, comprising:
   a microprocessor operable at either a first state or a second state, said second state requiring more power than said first state;
   an analog-to-digital converter operatively connected to said microprocessor, said analog-to-digital converter being configured to receive a current-sensing signal, and being configured to provide said current-sensing signal to said microprocessor; and
   a power supply being configured to receive a first current, or a second current alone or in combination with said first current, said power supply providing an output to said microprocessor indicative of whether said power supply is receiving said second current, said power supply providing an operating current to said microprocessor and said analog-to-digital converter; and
   said microprocessor being configured to adjust between said first and second states depending upon said output.

10. The trip unit as in claim 9, wherein said microprocessor is configured to operate in said first state when said output indicates said power supply is receiving only said first current and being configured to operate in said second state when said output indicates said power supply is receiving said second current or a combination of said first and second currents.

11. The trip unit as in claim 10, wherein said microprocessor adjusts between said first and second states by adjusting one or more of a clock speed of said microprocessor, an operating voltage of said microprocessor, and an operating current to one or more peripherals of said microprocessor.

12. The trip unit as in claim 11, wherein said microprocessor is configured to provide only a set of basic protection features in said first state, and is configured
to provide said set of basic protection features and a set of functional features in said second state.

13. The trip unit as in claim 12, wherein said set of basic protection features is selected from the group consisting of instantaneous over current protection, long time protection, short time protection, and ground fault protection.

14. The trip unit as in claim 12, wherein said analog-to-digital converter is configured to receive a voltage-sensing signal, and is configured to provide said voltage-sensing signal to said microprocessor.

15. The trip unit as in claim 14, wherein said set of functional features are selected from the group consisting of waveform capture, metering, voltage protection algorithms, current protection algorithms, and communication functions.

16. A circuit breaker, comprising:
a trip unit including a microprocessor and a power supply;
a current sensor operatively connecting said trip unit to a power system, said current sensor providing a current-sensing signal to said microprocessor and a first current to said power supply; and
an output from said power supply to said microprocessor, said output being indicative of whether said power supply is receiving said first current, or a second current from an auxiliary power source alone or in addition to said first current, wherein said microprocessor operates at a first state when said power supply receives only said first current, but operates at a second state when said power supply receives said second current alone or in addition to said first current.

17. The circuit breaker as in claim 16, further comprising:
an actuator operatively connecting said microprocessor to a plurality of separable contacts of said power system.

18. The circuit breaker as in claim 16, wherein said microprocessor is configured to provide only a set of basic protection features in said first state, but to provide said set of basic protection features and a set of functional features in said second state.

19. The circuit breaker as in claim 18, wherein said set of basic protection features is selected from the group consisting of instantaneous over current protection, long time protection, short time protection, and ground fault protection.

20. The circuit breaker as in claim 18, further comprising:
a voltage sensor operatively connecting said trip unit to said power system, said voltage sensor providing a voltage-sensing signal to said microprocessor.

21. The circuit breaker as in claim 20, wherein said set of functional features are selected from the group consisting of waveform capture, metering, voltage protection algorithms, current protection algorithms, and communication functions.

22. The circuit breaker as in claim 16, wherein said microprocessor adjusts between said first and second states by adjusting one or more of a clock speed of said microprocessor, an operating voltage of said microprocessor, an operating current to one or more peripherals of said microprocessor.

23. A control algorithm for a trip unit, comprising:
a first decision node configured to determine whether to operate a microcontroller in a first state if no auxiliary current is provided to a power supply of said trip unit and to operate said microcontroller in a second state if said auxiliary current is provided to said power supply, said first state consumes a first level of power by executing only a set of basic protection features and said second state consumes a second level of power by executing said set of basic protection features and a set of functional features, wherein second level of power is higher than said first level of power.

* * * * *